(12) United States Patent
Miyahara et al.

(10) Patent No.: US 10,275,190 B2
(45) Date of Patent: Apr. 30, 2019

(54) IMAGE FORMING APPARATUS PROVIDED WITH EXPOSURE HEAD HAVING LIGHT EMITTING PORTIONS AND LENS ARRAY

(71) Applicant: Brother Kogyo Kabushiki Kaisha, Nagoya-shi, Aichi-ken (JP)

(72) Inventors: Kensuke Miyahara, Nagoya (JP); Masahiko Hayakawa, Ama (JP); Toshio Furukawa, Nagoya (JP); Junichi Yokoi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/026,102

(22) Filed: Jul. 3, 2018

(65) Prior Publication Data
US 2019/0012119 A1 Jan. 10, 2019

(30) Foreign Application Priority Data
Jul. 4, 2017 (JP) .................................. 2017-131113

(51) Int. Cl.
*G06F 15/00* (2006.01)
*G06F 3/12* (2006.01)
*H04N 1/00* (2006.01)

(52) U.S. Cl.
CPC .......... *G06F 3/1208* (2013.01); *G06F 3/1258* (2013.01); *H04N 1/00037* (2013.01); *H04N 1/00045* (2013.01); *H04N 1/00087* (2013.01)

(58) Field of Classification Search
CPC combination set(s) only.
See application file for complete search history.

(56) References Cited

U.S. PATENT DOCUMENTS 8,294,950 B2 * 10/2012 Shiraki ................ H04N 1/6033
358/1.9
8,948,632 B2   2/2015 Yokoi
2013/0136472 A1  5/2013 Yokoi

FOREIGN PATENT DOCUMENTS

JP      2004-114343 A    4/2004
JP      2013-113989 A    6/2013

* cited by examiner

*Primary Examiner* — Helen Zong
(74) *Attorney, Agent, or Firm* — Banner & Witcoff, Ltd.

(57) ABSTRACT

In an image forming apparatus, a plurality of light emitting portions arrayed in an array direction. A lens array has a length in the array direction longer than a length in a direction orthogonal to the array direction. A controller is configured to perform: converting a reference printing pattern including a plurality of first linear patterns to a detection pattern including a plurality of second linear patterns, each of the plurality of first linear patterns forming a first angle with respect to a reference line parallel to the array direction, each of the plurality of second linear patterns forming a second angle smaller than the first angle with respect to the reference line; forming a detection pattern image on a transfer medium; detecting a print density of the detection pattern image with a sensor; and setting an image formation condition according to the print density detected by the sensor.

13 Claims, 11 Drawing Sheets

IMAGE FORMING APPARATUS PROVIDED WITH EXPOSURE HEAD HAVING LIGHT EMITTING PORTIONS AND LENS ARRAY

CROSS REFERENCE TO RELATED APPLICATION

This application claims priority from Japanese Patent Application No. 2017-131113 filed Jul. 4, 2017. The entire content of the priority application is incorporated herein by reference.

TECHNICAL FIELD

The present disclosure relates to an image forming apparatus.

BACKGROUND

A conventional image forming apparatus known in the art records a test image on recording material, measures the density of the test image recorded on the recording material, finds the difference between the measured density of the actual recorded image and the image density intended to be recorded on the recording material, and corrects this density difference.

One method of correcting this density difference involves setting an image formation condition for developer images by modifying the developing bias or the like on the basis of the measured density.

SUMMARY

The conventional image forming apparatus is provided with an exposure head that includes an LED array or other light-emitting elements. Here, the focal point of the exposure head can sometimes deviate from its optimal position. When a test image is formed using an exposure head whose focal point has deviated, the density of the test image formed by the image forming apparatus will change due to the effects of this focal point deviation, resulting in the image forming apparatus being unable to set a suitable image formation condition.

In view of the foregoing, it is an object of the present disclosure to provide an image forming apparatus that can set a suitable image formation condition, even when the focal point of the exposure head has deviated.

In order to attain the above and other objects, the present disclosure provides an image forming apparatus that includes: a developing device; an exposure head; a sensor; and a controller. The developing device is configured to form a developer image on a transfer medium. The developer device includes a photosensitive member. The exposure head is configured to expose the photosensitive member. The exposure head includes: a plurality of light emitting portions; and a lens array. The plurality of light emitting portions is arrayed in an array direction. Each of the plurality of light emitting portions emits light in an optical axis direction. The lens array has a first length in the array direction and a second length shorter than the first length in a direction orthogonal to the array direction. The sensor is configured to detect a density of the developer image on the transfer medium. The controller is configured to perform: forming a printing pattern image on the transfer medium using a reference printing pattern having an exposure density corresponding to a prescribed target density, the exposure density being an area ratio of exposed area to total area in the printing pattern image, the reference printing pattern including a plurality of first linear patterns, each of the plurality of first linear patterns forming a first angle with respect to a reference line parallel to the array direction; converting the reference printing pattern to a detection pattern including a plurality of second linear patterns, the detection pattern having the exposure density corresponding to the prescribed target density, each of the plurality of second linear patterns forming a second angle with respect to the reference line, the second angle being smaller than the first angle; forming a detection pattern image on the transfer medium using the detection pattern; detecting a print density of the detection pattern image with the sensor; and setting an image formation condition according to the print density detected by the sensor and the prescribed target density.

According to another aspect, the present disclosure provides a method for setting an image formation condition for a developer image formed by an image forming apparatus. The image forming apparatus includes: a developing device; an exposure head; and a sensor. The developing device is configured to form the developer image on a transfer medium. The developing device includes a photosensitive member. The exposure head is configured to expose the photosensitive member. The exposure head includes: a plurality of light emitting portions; and a lens array. The plurality of light emitting portions is arrayed in an array direction. Each of the plurality of light emitting portions emits light in an optical axis direction. The optical member has a first length in the array direction and a second length shorter than the first length in a direction orthogonal to the array direction. The sensor is configured to detect a density of the developer image on the transfer medium. The method includes: forming a printing pattern image on the transfer medium using a reference printing pattern having an exposure density corresponding to a prescribed target density, the exposure density being an area ratio of exposed area to total area in the printing pattern image, the reference printing pattern including a plurality of first linear patterns, each of the plurality of first linear patterns forming a first angle with respect to a reference line parallel to the array direction; converting the reference printing pattern to a detection pattern including a plurality of second linear patterns, the detection pattern having the exposure density corresponding to the prescribed target density, each of the plurality of second linear patterns forming a second angle with respect to the reference line, the second angle being smaller than the first angle; forming a detection pattern image on the transfer medium using the detection pattern; detecting a print density of the detection pattern image with the sensor; and setting an image formation condition according to the print density detected by the sensor and the prescribed target density.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Next, an embodiment of the present disclosure will be described in detail while referring to the accompanying drawings. Below, a brief description of the overall structure of a color printer 1 serving as an example of the image forming apparatus will be provided, after which the structures of feature parts of the disclosure will be described in greater detail.

The directions used in the following description will conform to the directions indicated in FIG. 1. That is, the left side of the color printer 1 in FIG. 1 will be called the "front," the right side will be called the "rear," the far side will be called the "left," and the near side will be called the "right." The upper side of the color printer 1 in FIG. 1 will be called the "top," while the lower side will be called the "bottom."

Figure 1:
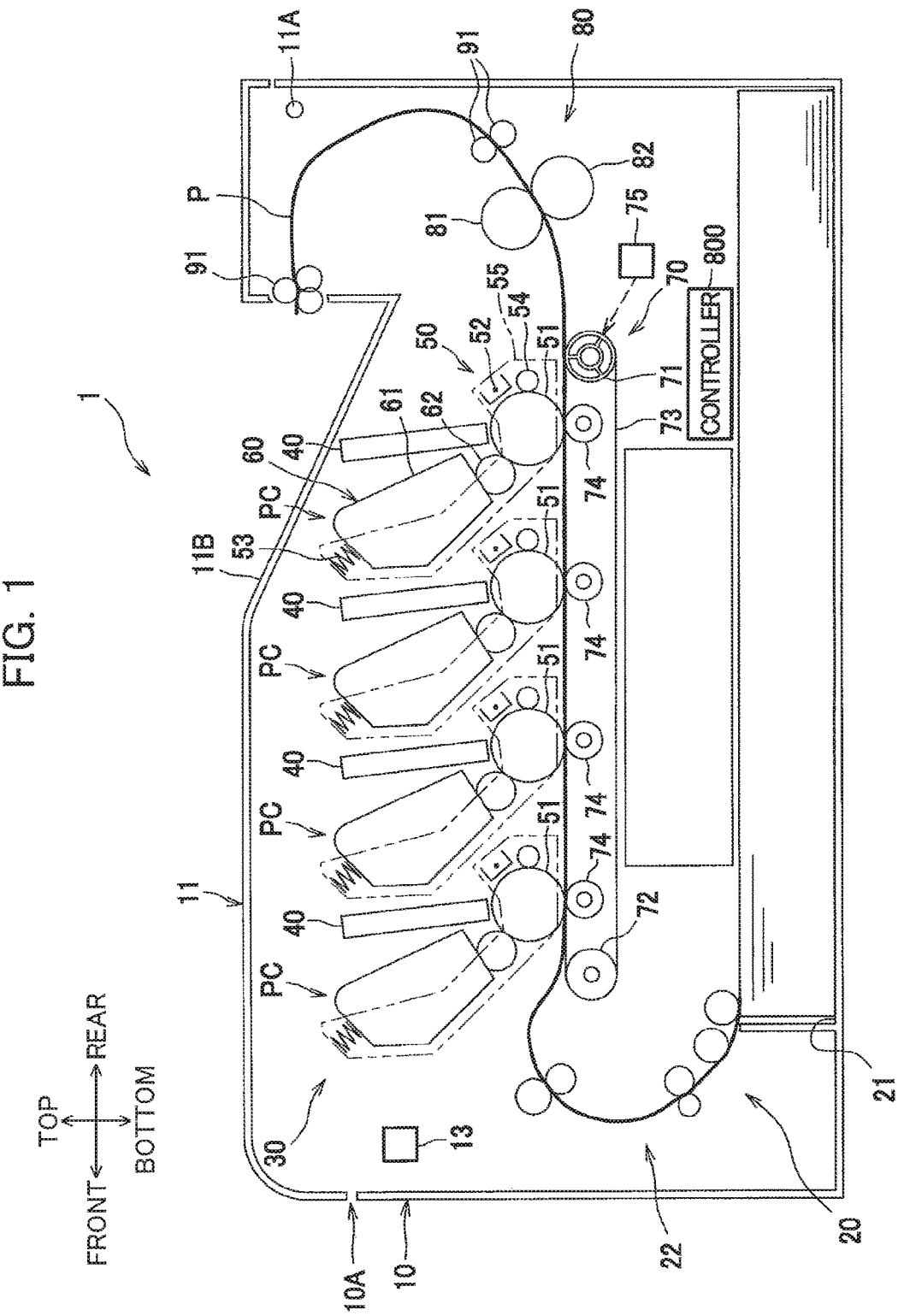
FIG. 1 is schematic cross-sectional diagram of a color printer according to one embodiment of the present disclosure, illustrating a state where a top cover is in a closed position.

As illustrated in FIG. 1, the color printer 1 is provided with a body casing 10, a top cover 11, and a sheet-feeding unit 20 and an image-forming unit 30 disposed inside the body casing 10. Also provided in the body casing 10 are a temperature sensor 13 for detecting the internal temperature of the body casing 10, a patch sensor 75 as an example of the sensor in the present disclosure, and a controller 800.

Figure 2:
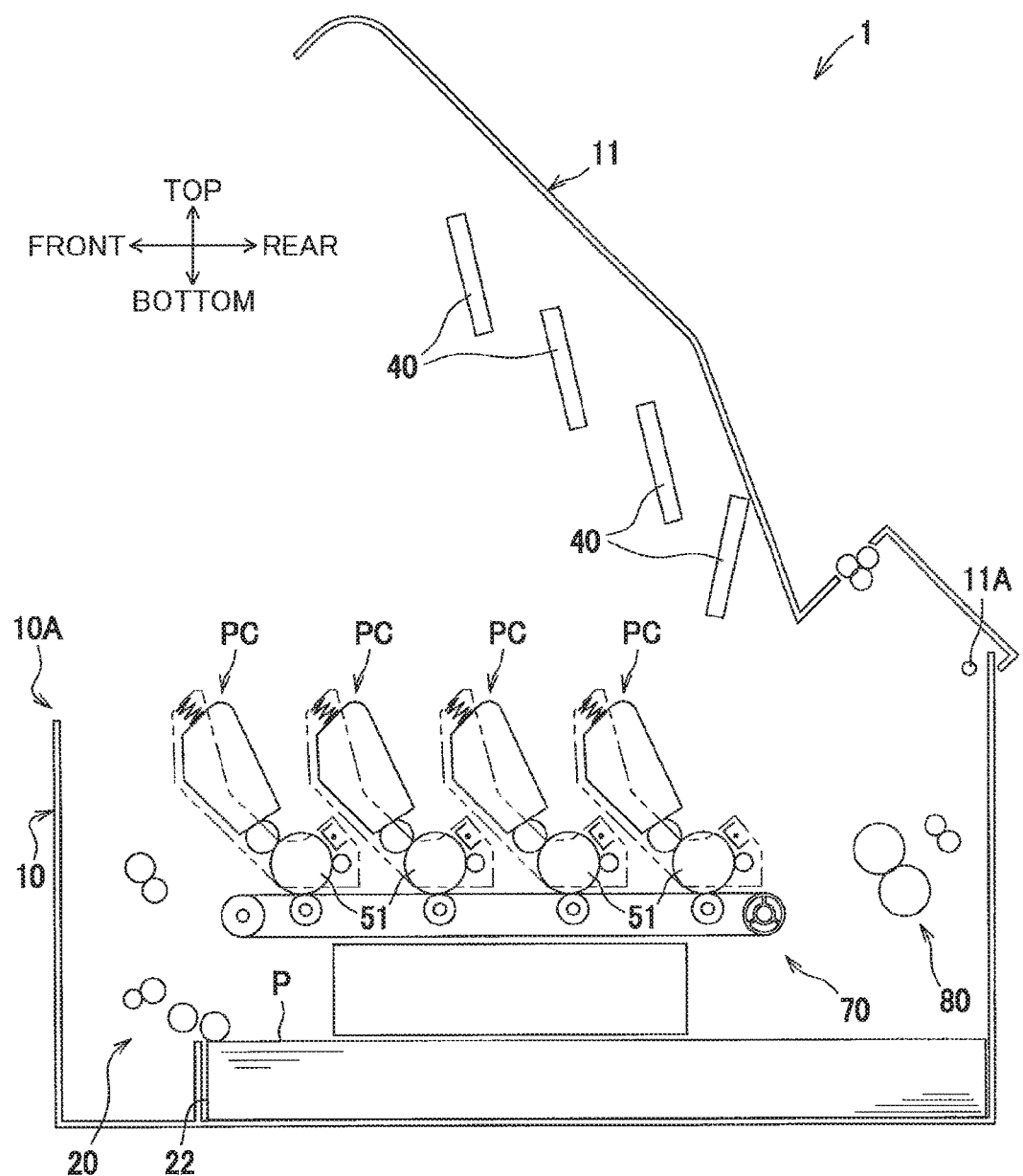
FIG. 2 is a schematic cross-sectional diagram of the color printer according to the embodiment, illustrating a state where the top cover is in an open position.

The top cover 11 is disposed on the top portion of the body casing 10. The top cover 11 is capable of rotating relative to the body casing 10 about a rotational shaft 11A disposed on the rear side of the top cover 11. By rotating, the top cover 11 exposes or covers an opening 10A formed in the top of the body casing 10. More specifically, the top cover 11 can be moved between a closed position (the position in FIG. 1) for covering the opening 10A, and an open position (the position in FIG. 2) for exposing the opening 10A.

The sheet-feeding unit 20 is disposed in the lower section of the body casing 10. The sheet-feeding unit 20 includes a sheet-feeding tray 21 that accommodates sheets P of paper, and a sheet-feeding mechanism 22 that supplies the sheets P from the sheet-feeding tray 21 to the image-forming unit 30.

The image-forming unit 30 is provided with four exposure heads 40, four process cartridges PC, a transfer unit 70, and a fixing unit 80.

Each exposure head 40 has light-emitting elements and imaging lenses in the distal (lower) end thereof. The exposure heads 40 are retained in the top cover 11 (and more specifically a holder 12 described later) so as to hang down from the inner surface of the top cover 11. When the top cover 11 is in its closed position, the exposure heads 40 are disposed in positions for confronting the tops of photosensitive members 51 described later. Specifically, through the closing and opening of the top cover 11, the exposure heads 40 can be moved between a standard position (the position in FIG. 1) in proximity of the photosensitive members 51, and a retracted position (the position in FIG. 2) separated from the photosensitive members 51. The exposure heads 40 expose the surfaces of the corresponding photosensitive members 51 by flashing their light-emitting elements on and off on the basis of image data. The structure of the exposure heads 40 will be described later in greater detail.

The process cartridges PC are arranged parallel to each other and juxtaposed along the front-rear direction between the top cover 11 and sheet-feeding tray 21. Each process cartridge PC can be mounted in and removed from the body casing 10 through the opening 10A while the top cover 11 is in its open position (see FIG. 2). Each process cartridge PC is provided with a drum unit 50, and a developing cartridge 60. The process cartridges PC are examples of the developing device in the present disclosure.

The drum unit 50 is provided with a photosensitive member 51, a charger 52, a pressing spring 53, a cleaning roller 54, and a drum frame 55. The photosensitive member 51 is a cylindrically shaped photosensitive drum. The charger 52 is a scorotron-type charger for applying charge to the photosensitive member 51. The pressing spring 53 urges the developing cartridge 60 toward the photosensitive member 51. The drum frame 55 supports the photosensitive member 51 and the like.

The developing cartridge 60 is primarily provided with a toner-accommodating section 61 for accommodating toner, and a developing roller 62 that supplies toner in the toner-accommodating section 61 onto the photosensitive member 51. The toner is a developer used to develop electrostatic latent images formed on the photosensitive member 51. The toner-accommodating sections 61 of the developing cartridges 60 accommodate toner in the respective colors yellow, magenta, cyan, and black in the order from the front side toward the rear side.

The transfer unit 70 is disposed between the sheet-feeding tray 21 and the process cartridges PC. The transfer unit 70 is provided with a drive roller 71, a follow roller 72, an endless conveying belt 73 as an example of the transfer medium in the present disclosure, and four transfer rollers 74. The conveying belt 73 is stretched taut around the drive roller 71 and follow roller 72. The drive roller 71 and follow roller 72 are positioned such that the outer surface of the conveying belt 73 contacts each of the photosensitive members 51. The transfer rollers 74 are disposed at positions below the corresponding photosensitive members 51 and inside the loop formed by the conveying belt 73 so that the conveying belt 73 is interposed between the transfer rollers 74 and the photosensitive members 51.

The patch sensor 75 is disposed obliquely below and rearward of the conveying belt 73 and faces the rear side of the same. The patch sensor 75 detects the print density of toner images formed on the conveying belt 73 for the purpose of correcting this print density. In the following description, a toner image formed on the conveying belt 73 for the purpose of correcting print density will be called a "patch." The patch sensor 75 is a reflection-type sensor provided with a light-emitting element, such as an LED, and a light-receiving element, such as a phototransistor. The light-emitting element irradiates light toward a patch, and the light-receiving element detects light reflected off the patch.

The fixing unit 80 is disposed to the rear of the process cartridges PC and the transfer unit 70. The fixing unit 80 is provided with a heating roller 81, and a pressure roller 82 that is pressed against the heating roller 81.

In the image-forming unit 30 having the above configuration, the charger 52 applies a uniform electric charge to the surface of the corresponding photosensitive member 51. Subsequently, the surface of the photosensitive member 51 is exposed by the corresponding exposure head 40 to form an electrostatic latent image on the photosensitive member 51 based on image data. Next, voltage is applied to the developing roller 62 to supply toner from the developing roller 62 to the photosensitive member 51, thereby developing the electrostatic latent image into a visible toner image formed on the photosensitive member 51. The voltage applied to the developing roller 62 will be called a developing bias. Hence, the transfer unit 70 develops the electrostatic latent image on the photosensitive member 51.

As a sheet P is conveyed on the conveying belt 73, the transfer rollers 74 sequentially transfer the toner images formed on the photosensitive members 51 onto the sheet P so that the images are superimposed over each other. After the toner images have been transferred onto the sheet P, the sheet P is conveyed between the heating roller 81 and pressure roller 82, whereby the toner image is thermally fixed to the sheet P. Subsequently, conveying rollers 91 discharge the sheet P from the body casing 10. The discharged sheet P is deposited onto a discharge tray 11B formed on the top surface of the top cover 11.

Next, structures around the photosensitive member 51 and the structure of the exposure head 40 will be described in greater detail.

Figure 3:
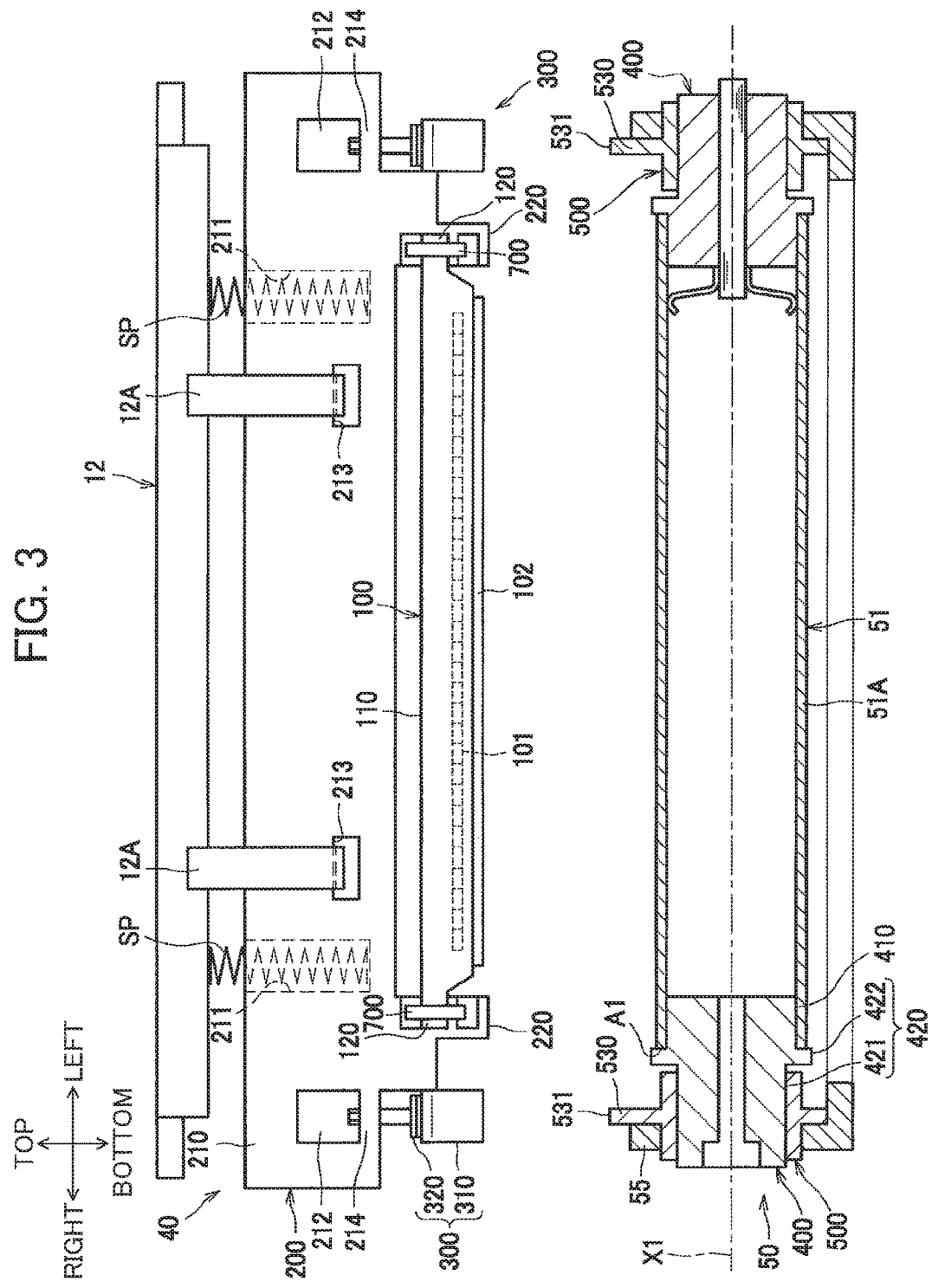
FIG. 3 is a diagram illustrating an exposure head in a standard position and a drum unit.

As illustrated in FIG. 3, the photosensitive member 51 has a rotational axis X1 that is oriented in the left-right direction in the present embodiment. In the following description, the direction in which the rotational axis X1 is oriented, i.e., the left-right direction, will simply be called the "axial direction."

A rotational support member 500 rotatably supports each end of the photosensitive member 51 in the axial direction. The rotational support members 500 disposed on both ends of the photosensitive member 51 are supported in the drum frame 55.

The photosensitive member 51 is provided with a cylindrical tube 51A, and two fitting members 400 that are fitted into the tube 51A so as to be in contact with the inner circumferential surface of the same. The tube 51A is formed of a metal or other electrically conductive material. A photosensitive layer is formed on the outer circumferential surface of the tube 51A.

The fitting members 400 are disposed on both ends of the tube 51A in the axial direction. The fitting members 400 are formed of a resin material. By fitting the fitting members 400 into the ends of the tube 51A, the fitting members 400 can rotate together with the tube 51A. Each fitting member 400 is integrally configured of a fitted part 410 and an exposed part 420. The fitted part 410 is positioned on the inside of an endface A1 of the tube 51A relative to the axial direction, and the exposed part 420 is positioned on the outside of the endface A1 of the tube 51A relative to the axial direction.

The fitted part 410 has a general columnar shape. The fitted part 410 is fitted into the end of the tube 51A and contacts the inner circumferential surface of the same.

The exposed part 420 has a supported part 421 that is supported by the corresponding rotational support member 500, and a flange part 422 that protrudes radially outward from the outer circumferential surface of the supported part 421. The supported part 421 has a general columnar shape. The outer diameter of the supported part 421 is smaller than the outer diameter of the tube 51A.

The flange part 422 has a general disc shape. The flange part 422 is disposed between the supported part 421 and the fitted part 410 in the axial direction. The flange part 422 contacts the endface A1 of the tube 51A. The outer diameter of the flange part 422 is greater than the outer diameter of the tube 51A.

The rotational support member 500 rotatably supports the outer circumferential surface of the supported part 421 constituting the corresponding fitting member 400. The rotational support member 500 is configured of a plain bearing formed of a resin material. The rotational support member 500 is positioned outside the tube 51A in the axial direction.

The rotational support member 500 has a protruding part 530 that protrudes toward the exposure head 40. The protruding part 350 has a contact surface 531 that contacts the exposure head 40. The contact surface 531 is positioned farther outside radially than the surface of the tube 51A. Specifically, the contact surface 531 protrudes radially outward toward the exposure head 40 more than the outer circumferential surface of the flange part 422 constituting the fitting member 400.

The exposure head 40 is provided with a first frame 100, a second frame 200, and space-adjusting members 300 disposed between the second frame 200 and the drum unit 50.

The first frame 100 and the second frame 200 are formed of a resin material. The first frame 100 integrally includes a base part 110 and two extension parts 120. The base part 110 has a general rectangular parallelepiped shape that is elongated in the left-right direction. The extension parts 120 extend outward in left and directions from the corresponding left and right endfaces of the base part 110. The base part 110 is formed of a resin material. The front-rear center region of the base part 110 is open along the vertical (up-and-down) direction.

An LED array 101 is provided in the base part 110. A lens array 102 is provided in the bottom of the opening formed in the base part 110. The lens array 102 is an optical member that forms images on the surface of the photosensitive member 51 with light emitted from the LED array 101.

The LED array 101 is a semiconductor device having a plurality of light emitting regions (light-emitting units) 101A (see FIG. 5) aligned in the axial direction of the photosensitive member 51. The light emitting regions 101A are examples of the light emitting portions of the present disclosure, and the axial direction is an example of the array direction of the present disclosure. By flashing the light emitting regions 101A in sequence, light is scanned over the photosensitive member 51 for exposing the same. In the following description, the direction in which the light emitting regions 101A scan light over the photosensitive member 51 will be called the main scanning direction. Further, the direction along the optical axis of light emitted from the LED array 101 will be simply referred to as an optical axis direction. Additionally, the direction orthogonal to the optical axis direction and the main scanning direction will be called the sub scanning direction. In the present embodiment, the main scanning direction is substantially equivalent to the left-right direction, the axial direction of the photosensitive member 51, and the longitudinal direction of the exposure heads 40, the sub scanning direction is substantially equivalent to the front-rear direction, and the optical axis direction is substantially equivalent to the vertical (up-and-down) direction.

Figure 5:
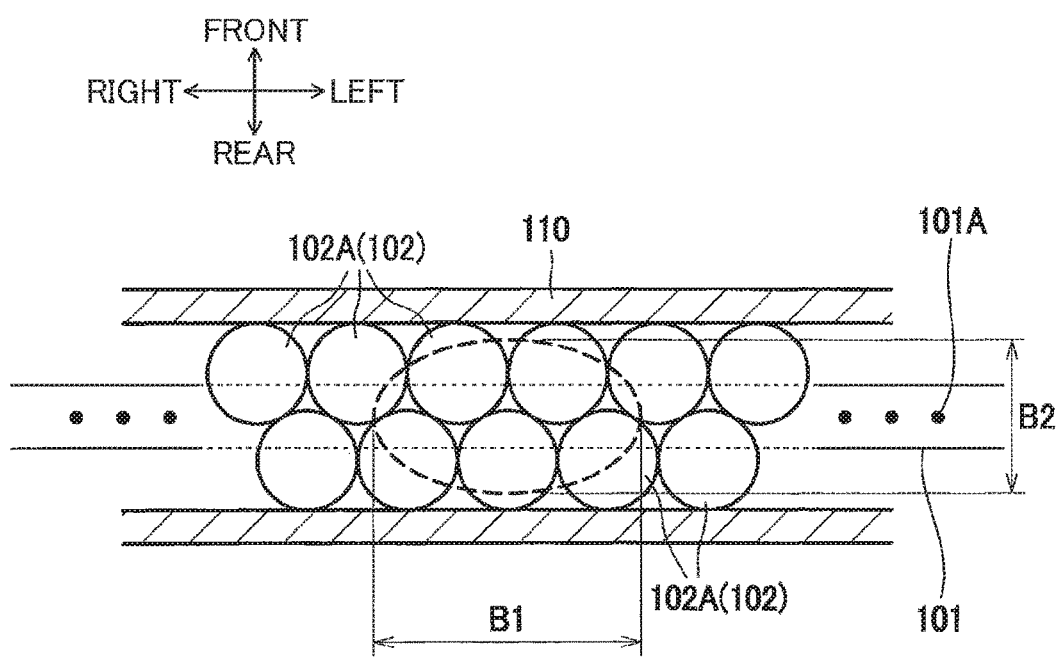
FIG. 5 is a diagram illustrating a LED array and a lens array in the exposure head.

As illustrated in FIG. 5, the lens array 102 has a plurality of imaging lenses 102A arrayed along the longitudinal direction of the exposure head 40. The imaging lenses 102A are configured of columnar refractive-index distribution lenses aligned in the main scanning direction in two staggered rows. Light emitted from a single light emitting region 101A of the LED array 101 is diffused light that is incident on the endfaces of a plurality of imaging lenses 102A to form an image in one location on the surface of the photosensitive member 51 as an erect image equivalent in size to the light emitting region 101A.

Since the imaging lenses 102A of the lens array 102 are arrayed so as to extend farther in the main scanning direction than the sub scanning direction, the aperture stop corresponding to light emitted from a single light emitting region 101A of the LED array 101 has a greater dimension in the main scanning direction than the dimension in the sub scanning direction. Hence, as indicated by the dashed line in FIG. 5, the light emitted from a single light emitting region 101A of the LED array 101 is incident on the lens array 102 in an area having a larger width B1 in the main scanning direction than its width B2 in the sub scanning direction. Since the depth of field for the imaging surface is shallower for larger widths of the aperture stop, the image is more susceptible to blurring in the main scanning direction when the focal point deviates in the present embodiment.

The extension parts 120 are positioned on the upper portion of the left and right ends of the base part 110. The second frame 200 supports the extension parts 120.

The second frame 200 is formed of a resin material that functions to support the first frame 100. A holder 12 supports the second frame 200 in a suspended state. The holder 12 is formed of a resin material and is rotatably supported on the top cover 11. The second frame 200 integrally includes a base part 210, and two protruding parts 220. The base part 210 has a general rectangular shape that is elongated in the left-right direction. The protruding parts 220 support both ends of the first frame 100 in the axial direction.

First recessed parts 211, second recesses parts 212, and holes 213 are formed in the base part 210. Two of the holes 213 are provided at positions separated from each other in the left-right direction. The holes 213 are arranged with left-right symmetry about the left-right center of the base part 210. Each hole 213 penetrates the base part 210 in the front-rear direction.

The holder 12 has hooks 12A at positions corresponding to the holes 213 for suspending the base part 210. The distal end of each hook 12A protrudes forward in the corresponding hole 213 and engages with the corresponding hole 213.

The first recessed parts 211 are recesses that open toward the holder 12. One of the first recessed parts 211 is formed on the outer left side of each of the two left and right holes 213 in the left-right direction, and another of the first recessed parts 211 is formed on the outer right side of each of the two left and right holes 213 in the left-right direction. A compressed coil spring SP is disposed between the bottom surface of each first recessed part 211 and the holder 12 as an urging member. The coil springs SP urge the exposure head 40 toward the photosensitive member 51.

The second recessed parts 212 are recesses that open toward one side in the front-rear direction. One of the second recessed parts 212 is formed on the outer left side of each of the left and right first recessed parts 211 in the left-right direction, and another of the second recessed parts 212 is formed on the outer right side of each of the left and right first recessed parts 211 in the left-right direction. Specifically, the second recessed parts 212 are disposed at positions closer to the ends of the base part 210 than the left-right center of the same. The lower walls defining the second recessed parts 212 are support walls 214 that support the space-adjusting members 300.

Each protruding part 220 protrudes toward the photosensitive member 51 from the bottom surface of the base part 210. Each extension part 120 of the first frame 100 is attached to the corresponding protruding part 220 by springs 700 formed of a resin material.

The space-adjusting members 300 serve to adjust the distance in the optical axis direction between the exposure head 40 and photosensitive member 51 when the exposure head 40 is in the standard position. Each space-adjusting member 300 is provided with a single contact member 310, and two spacers 320. By contacting the contact surface 531 of the rotational support member 500, the contact member 310 regulates the distance in the optical axis direction from the lens array 102 to the photosensitive member 51.

The contact members 310 are formed of a resin material. The support walls 214 support the contact members 310 so that the contact members 310 can move in the optical axis direction. The spacers 320 are disposed between the corresponding contact member 310 and support walls 214. The number of spacers 320 is appropriately set according to the dimensional error.

Figure 4:
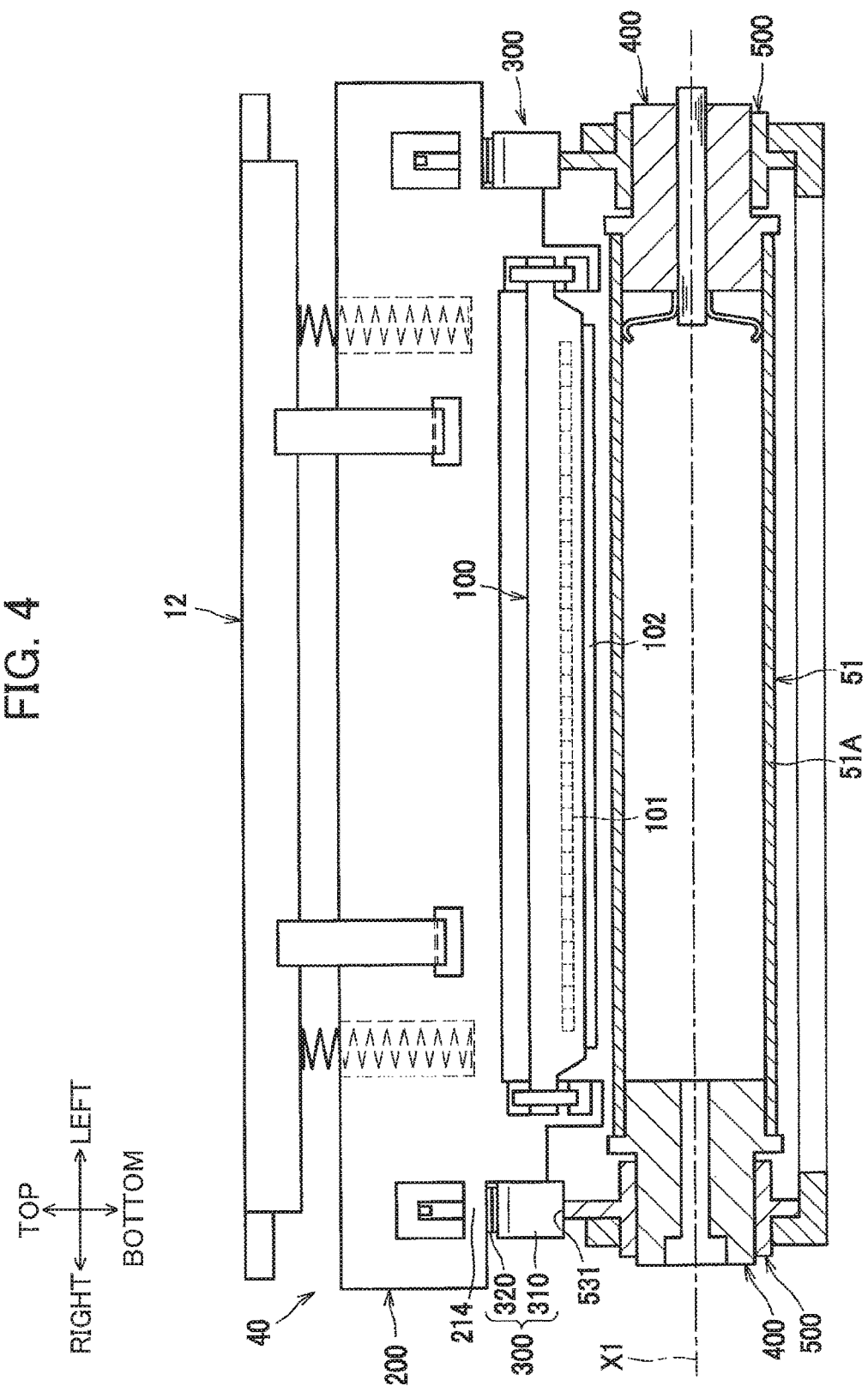
FIG. 4 is a diagram illustrating the exposure head in a retracted position and the drum unit.

The space-adjusting members 300 having the above configuration are supported in a suspended state from the second frame 200 when the exposure head 40 is in the retracted position. When the exposure head 40 is in the standard position illustrated in FIG. 4, the spacers 320 contact the corresponding support walls 214. Specifically, when the exposure head 40 moves from the retracted position toward the standard position, first movement of the contact members 310 is halted when the contact members 310 contact the corresponding contact surfaces 531 of the rotational support members 500. Thereafter, the second frame 200 approaches the contact members 310 whose movement has been halted. When the support walls 214 contact the spacers 320, movement of the second frame 200 is halted, fixing the position of the exposure head 40 in the optical axis direction.

Figure 6:
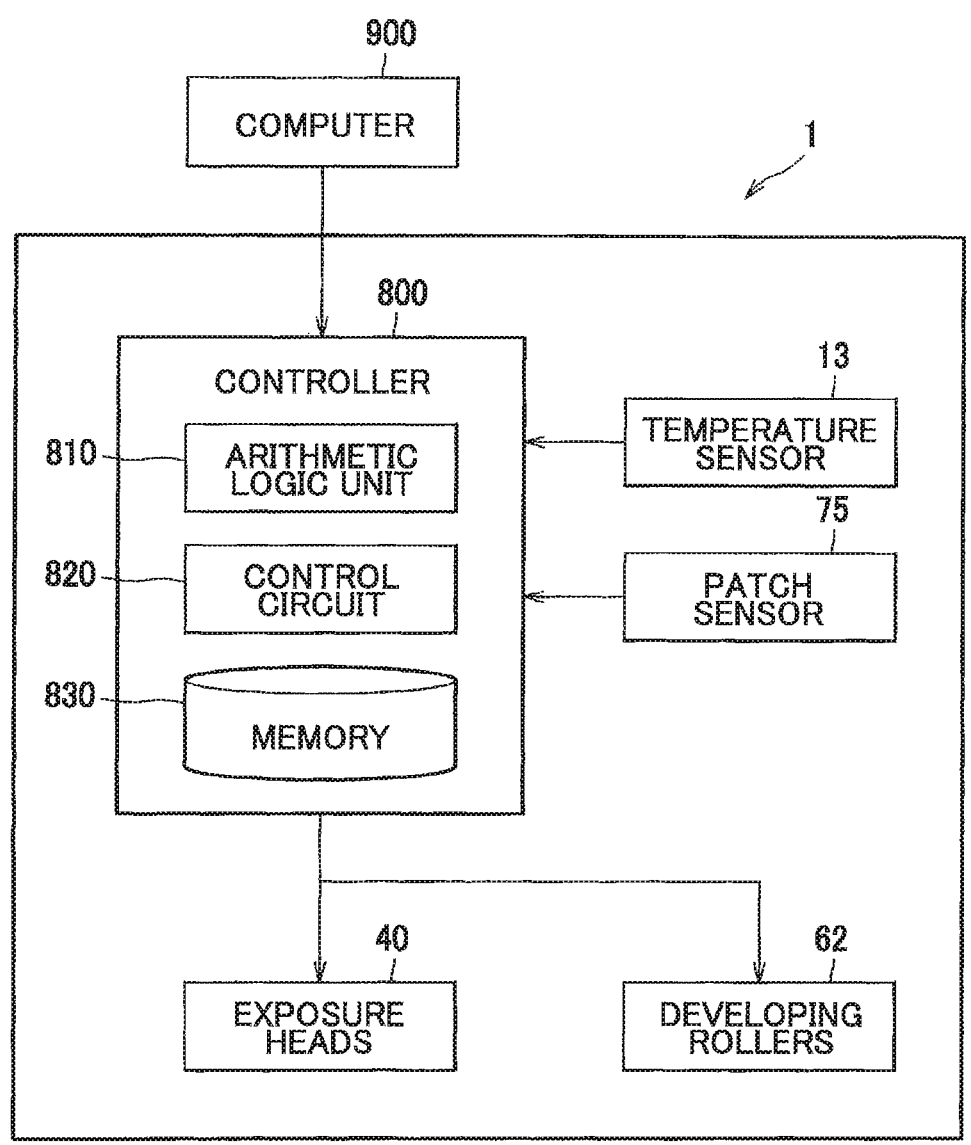
FIG. 6 is a block diagram illustrating a configuration of a control system in the color printer.

The controller 800 illustrated in FIG. 6 is provided with a central processing unit (CPU), a random access memory (RAM), a read-only memory (ROM), and an input/output circuit. The controller 800 executes control by performing various arithmetic processes based on a print job outputted from an external computer 900, information outputted from the sensors 13 and 75, and programs and data stored in the ROM and the like. Specifically, the controller 800 is provided with an arithmetic logic unit 810, such as a CPU; a control circuit 820 that controls the developing rollers 62, exposure heads 40, and the like; and a memory 830. The controller 800 executes print control and density correction by performing operations on the basis of programs stored in the memory 830.

The controller 800 has a function for executing print control to form images on sheets P on the basis of a print job received from the external computer 900. More specifically, when executing print control to print images on sheets P, the controller 800 selects one exposing pattern for printing (hereinafter called "printing pattern") from among a plurality of such printing patterns having different exposure densities, as illustrated in the examples of FIGS. 7A-7E, so that the printed image (hereinafter called "printing pattern image") has a density corresponding to a prescribed target density. The printing patterns are binary data, and the printing pattern images are binary images. The exposure density is the area ratio of exposed pixels to all pixels in the printing pattern image.

Here, the print density indicates the density of a toner image developed by the developing roller 62 and detected by the patch sensor 75. Further, the target density is the density specified in the print command. For example, when the print command specifies a target density of 20%, the controller 800 selects a printing pattern having a 20% exposure density and executes print control using this printing pattern. However, the relationship between the target density and the exposure density may be modified in a gradation setting process described later. For example, if the printing pattern that is associated with a target density of 20% were to be changed from a printing pattern having an exposure density of 20% to a printing pattern having an exposure density of 10%, the controller 800 would execute image formation using the printing pattern with an exposure density of 10% when forming images at the target density of 20%.

After selecting the printing pattern that corresponds to the target density from among the plurality of printing patterns as described above, the controller 800 performs exposure and developing operations using this printing pattern to form a toner image at the target density on the photosensitive member 51.

FIGS. 7A-7E illustrate examples of printing patterns P1-P5 corresponding to the exposure densities 20, 40, 60, 80, and 100%. Here, each arrow D1 denotes the main scanning direction, and each arrow D2 denotes the sub scanning direction. The printing patterns P1-P5 are stored in the memory 830 in advance. However, printing patterns corresponding to various other exposure densities, such as 90% and the like, are also stored in the memory 830. Here, the printing patterns P1-P5 illustrated in FIGS. 7A-7E denote printing patterns corresponding to one of the colors yellow, magenta, cyan, and black.

Figure 7A:
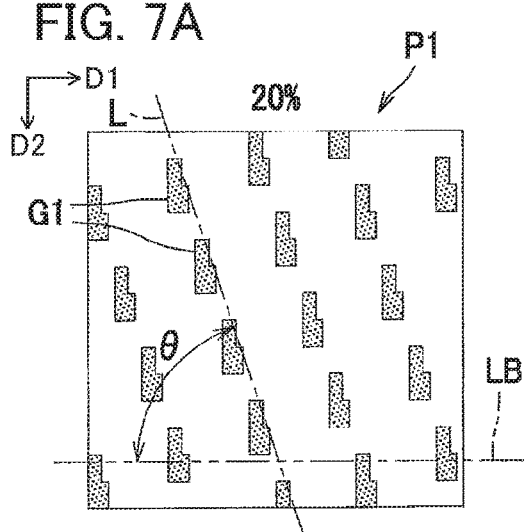
FIG. 7A is a diagram illustrating an example of a printing pattern corresponding to a 20% exposure density.

As illustrated in FIG. 7A, the first printing pattern P1 corresponding to a 20% exposure density has a plurality of unit patterns G1. The unit patterns G1 are arranged at different positions so as to be separated from each other in both the main scanning direction D1 and sub scanning direction D2. The lengths of the unit patterns G1 in the sub scanning direction are greater than their lengths in the main scanning direction.

Figure 7B:
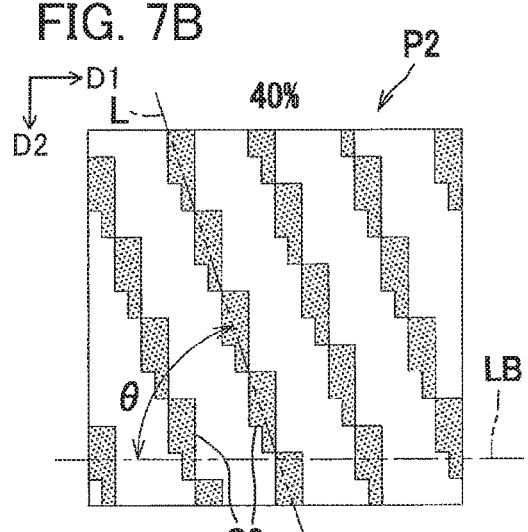
FIG. 7B is a diagram illustrating an example of a printing pattern corresponding to a 40% exposure density.

As illustrated in FIG. 7B, the second printing pattern P2 corresponding to a 40% exposure density is configured of a plurality of linear patterns G2.

Figure 7C:
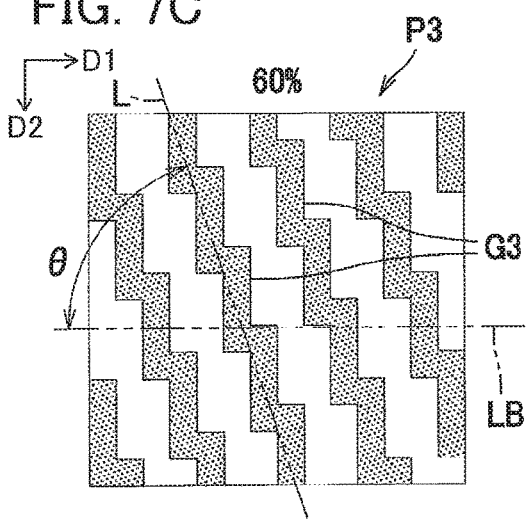
FIG. 7C is a diagram illustrating an example of a printing pattern corresponding to a 60% exposure density.

As illustrated in FIG. 7C, the third printing pattern P3 corresponding to a 60% exposure density is configured of a plurality of linear patterns G3.

Figure 7D:
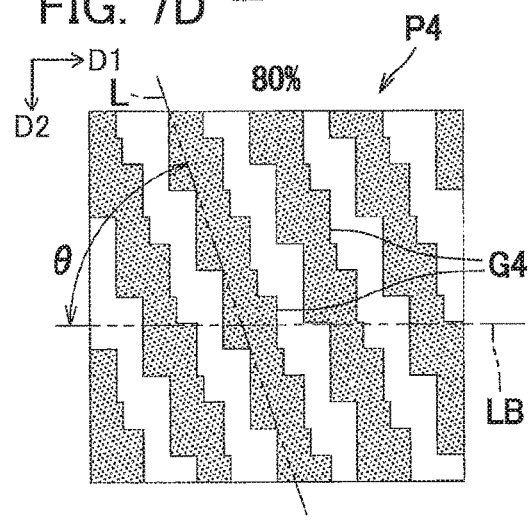
FIG. 7D is a diagram illustrating an example of a printing pattern corresponding to an 80% exposure density.

As illustrated in FIG. 7D, the fourth printing pattern P4 corresponding to an 80% exposure density is configured of a plurality of linear patterns G4.

An angle θ formed by each of the patterns G1-G4 and a reference line LB is equal to or greater than 45 degrees. Specifically, the reference line LB is a line parallel to the main scanning direction D1 and longitudinal direction of the exposure head 40, and the angle θ formed by each of the lines L aligned with the patterns G1-G4 and the reference line LB is equal to or greater than 45 degrees. More specifically, each of the lines L and the reference line LB form two angles, and the angle θ is the smaller one of the angles. That is, the other one of the angles is an angle (180-θ) degrees. Hereinafter, the angle θ will be called the first angle θ. Note that the printing patterns P1-P5 illustrated in FIGS. 7A-7E denote printing patterns for a certain color, and patterns corresponding to different colors may have different pattern shapes or different angles θs.

Figure 7E:
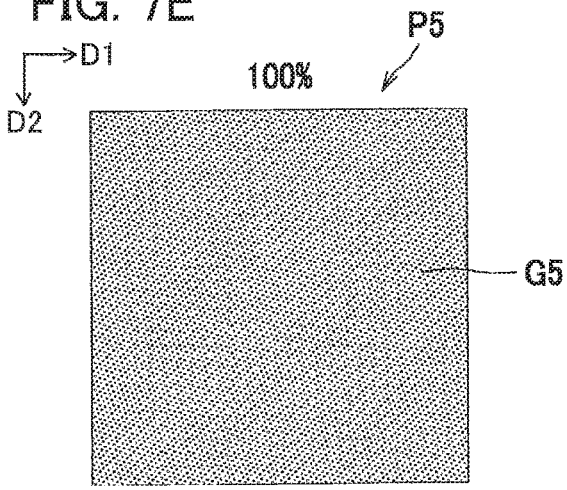
FIG. 7E is a diagram illustrating an example of a printing pattern corresponding to a 100% exposure density.

As illustrated in FIG. 7E, the fifth printing patterns P5 corresponding to a 100% exposure density has a single unit image G5. The unit pattern G5 is configured to fill the entire area in which the fifth printing pattern P5 is formed.

Returning to FIG. 6, the controller 800 possesses functions for setting a developing bias and executing a gradation setting process. Specifically, the controller 800 can implement a mode for only setting the developing bias and a mode for both setting the developing bias and performing the gradation setting process on the basis of various conditions that will be described later in greater detail.

Figure 8:
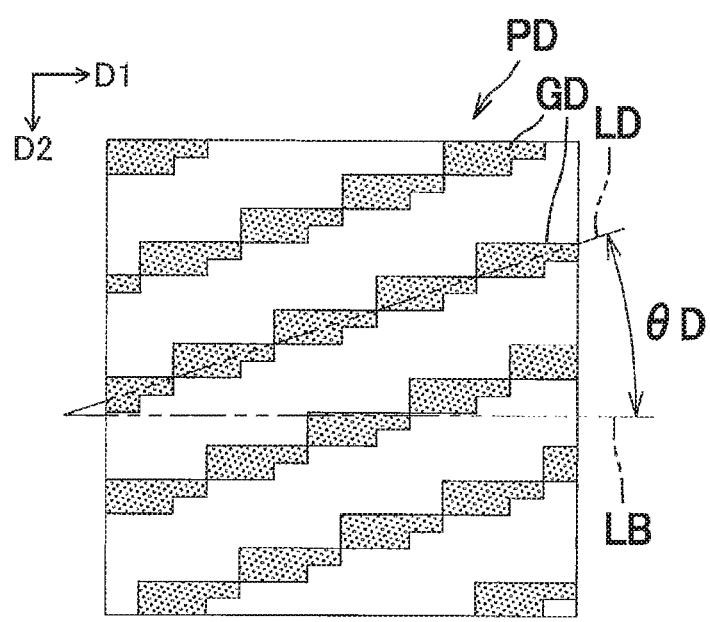
FIG. 8 is a diagram illustrating an example of a detection pattern corresponding to a 40% exposure density.

To set the developing bias, the controller 800 executes a conversion process, a detection process, and an image formation condition setting process. In the conversion process, the controller 800 converts the second printing pattern P2 described above and illustrated in FIG. 7B to a detection pattern PD illustrated in FIG. 8. The detection pattern PD is an exposing pattern for forming a detection pattern image. Specifically, the controller 800 rotates the second printing pattern P2 90 degrees in the conversion process to convert the second printing pattern P2 to the detection pattern PD.

The detection pattern PD is configured of a plurality of linear patterns GD. Each linear pattern GD is sloped a second angle θD relative to the reference line LB. As stated above, the reference line LB is a line parallel to the main scanning direction D1 and the longitudinal direction of the exposure head 40. Thus, each linear pattern GD is sloped the second angle θD relative to the longitudinal direction of the exposure head 40. The second angle θD is a smaller one of two angles formed by a line LD following the linear pattern GD and the reference line LB. The second angle θD is smaller than the first angle θ. Specifically, the second angle θD formed by the line LD and reference line LB is less than or equal to 45 degrees.

In the detection process, the controller 800 forms a detection pattern image based on the detection pattern PD on the conveying belt 73 and detects the detection pattern image based on the detection pattern PD with the patch sensor 75. Specifically, the controller 800 uses two different developing biases to form two detection pattern images based on the detection pattern PD in the detection process. More specifically, the controller 800 uses the detection pattern PD to form two electrostatic latent images on the photosensitive member 51 and then develops the latent images using two different developing biases to form two types of print density patches on the photosensitive member 51. Subsequently, the controller 800 transfers the patches from the photosensitive member 51 onto the conveying belt 73 and detects each patch on the conveying belt 73 with the patch sensor 75.

In the image formation condition setting process, the controller 800 sets the developing bias on the basis of the detection results in the detection process as an example of the image formation condition for the developer image. Specifically, the controller 800 converts the intensity of light reflected off each patch as detected by the patch sensor 75 to a print density, calculates the developing bias by which the print density will achieve the target density on the basis of the two different print densities and two different developing biases, and replaces the previous developing bias with the newly calculated developing bias.

The gradation setting process is performed to modify the relationship between the target density and the printing pattern. The controller 800 forms the printing pattern images based on the printing patterns P1-P5 using the developing bias set according to the image formation condition setting process, and executes the gradation setting process based on detected densities obtained by the patch sensor 75 detecting each of the printing pattern images P1-P5, i.e., the print densities.

More specifically, the controller 800 forms five electrostatic latent images on the photosensitive member 51 using the printing patterns P1-P5 corresponding to exposure densities of 20, 40, 60, 80, and 100%, and forms five different print density patches by developing each of the electrostatic latent images with the currently set developing bias. Subsequently, the controller 800 uses the patch sensor 75 to detect each patch transferred from the photosensitive member 51 onto the conveying belt 73. In the gradation setting process, the controller 800 converts the intensity of light reflected off each of the patches to a corresponding print density. Next, the controller 800 compares each calculated print density to the corresponding exposure density. When the print density and exposure density are different, the controller 800 changes the relationship between the target density and the printing pattern by correcting the relationship between the print density and exposure density. The details of this correction will be described later.

In addition to the printing patterns P1-P5 described above, the memory 830 also stores various threshold values used for control, a program for directing operations of the controller 800, and the like.

Figure 9:
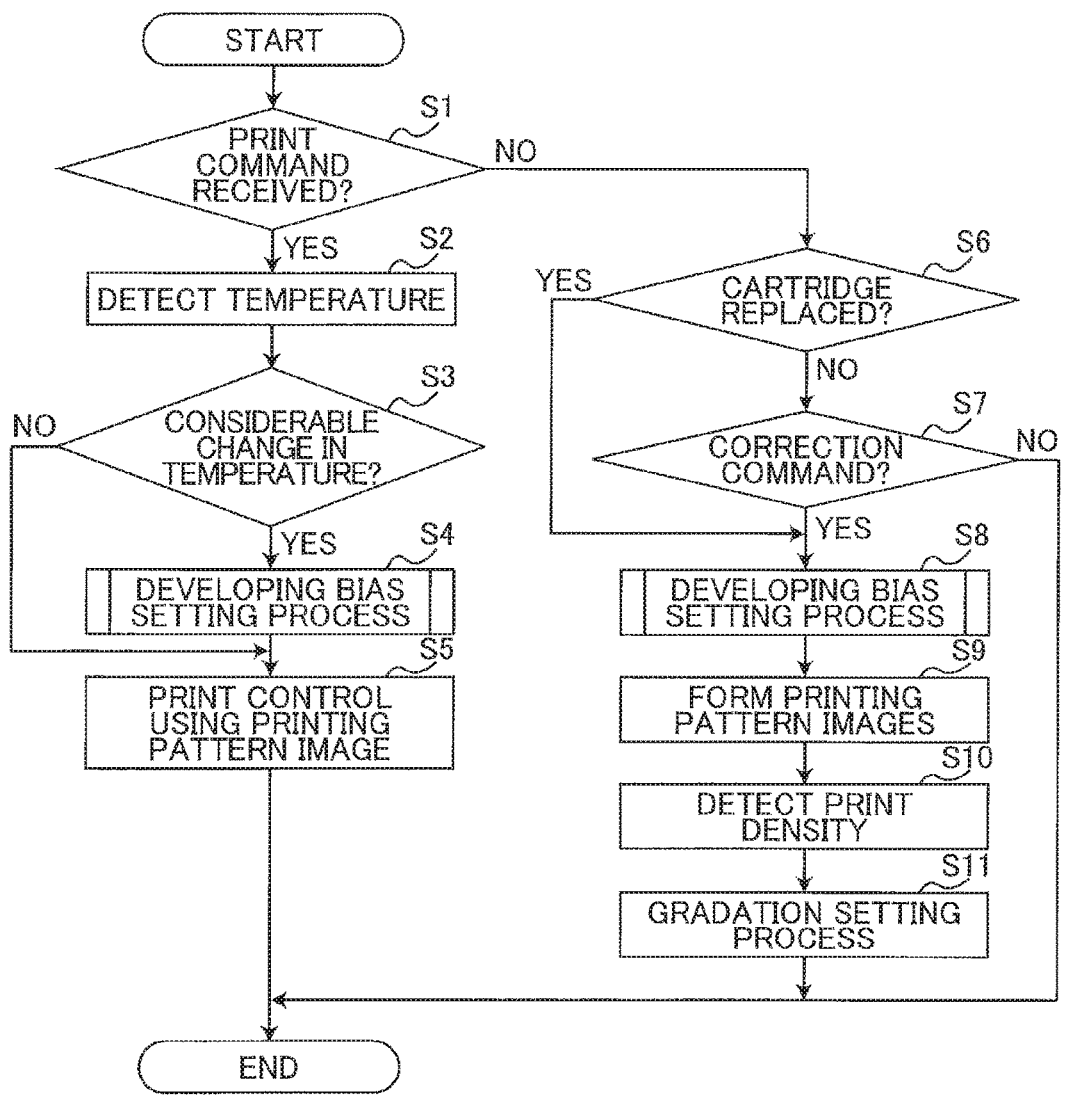
FIG. 9 is a flowchart illustrating steps in a control process performed by a controller in the color printer.

Next, the operations of the controller 800 will be described in greater detail. FIG. 9 is a flowchart illustrating steps in a control process performed by the controller 800.

In S1 of FIG. 9, the controller 800 determines whether a print command has been received. If the controller 800 determines that a print command was received (S1: YES), in S2 the controller 800 detects the temperature in the body casing 10 with the temperature sensor 13. In S3 the controller 800 determines whether there has been a considerable change in temperature since the previous print control operation by determining whether the difference between the currently detected temperature and the previously detected temperature is greater than or equal to a prescribed value.

Figure 10:
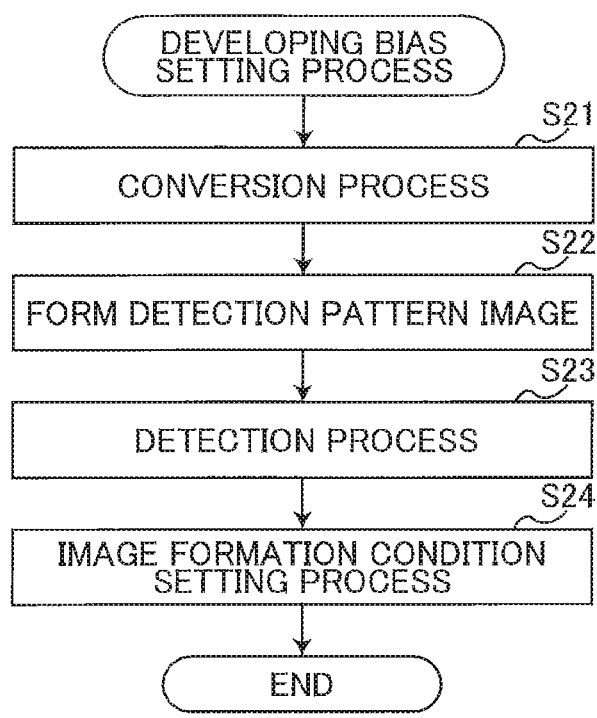
FIG. 10 is a flowchart illustrating steps in a developing bias setting process performed by the controller in the color printer.

If the controller 800 determines that the change in temperature is considerable (S3: YES), in S4 the controller 800 executes a developing bias setting process. FIG. 10 is a flowchart illustrating steps in the developing bias setting process. In S21 of FIG. 10, the controller 800 performs the conversion process to convert the second printing pattern P2 to the detection pattern PD.

In S22 the controller 800 forms the detection pattern image based on the detection pattern PD on the conveying belt 73, and in S23 the controller 800 uses the patch sensor 75 to detect the detection pattern image based on the detection pattern PD on the conveying belt 73. In S24 the controller 800 executes the image formation condition setting process to set the developing bias on the basis of the detection results by the patch sensor 75 and subsequently ends the developing bias setting process.

After completing S4 in FIG. 9 or when the controller 800 determines in S3 that the temperature has not changed considerably (S3: NO), in S5 the controller 800 executes printing control using the printing pattern.

Specifically, when printing a prescribed part of the sheet P in S5, the controller 800 selects a printing pattern having an exposure density corresponding to the print density of the prescribed part as specified in the print command, and executes print control using the selected printing pattern. For example, when the print density of the prescribed part is specified as 20% in the print command, the controller 800 selects the first printing pattern P1 corresponding to the 20% exposure density and uses this first printing pattern P1 to print the prescribed part. After completing the print control process in S5, the controller 800 ends the current control process.

On the other hand, if the controller 800 determines in S1 that a print command has not been received (S1: NO), in S6 the controller 800 determines whether a process cartridge PC was replaced. If the controller 800 determines in S6 that a process cartridge PC was not replaced (S6: NO), in S7 the controller 800 determines whether the user issued a command to correct the print density (correction command). Here, a user command to correct print density may be a correction command outputted from the external computer 900 in response to a user operation on the external computer 900, or may be a correction command outputted from a control panel (not illustrated) provided on the color printer 1 in response to user operations on the control panel.

If the controller 800 determines that no correction command was issued (S7: NO), the controller 800 ends the current control process. However, if the controller 800 determines that a correction command was issued (S7: YES) or when the controller 800 determines in S6 that a process cartridge PC was replaced (S6: YES), in S8 the controller 800 executes the developing bias setting process. The developing bias setting process in S8 is identical to the process in S4, and a description of this process will not be repeated. After completing the process of S8, in S9 the controller 800 forms five patches on the conveying belt 73 using the five printing patterns P1-P5 corresponding to the five exposure densities ranging between 20 and 100%.

In S10 the controller 800 detects the print density of each patch using the patch sensor 75. In S11 the controller 800 compares each detected print density to the corresponding exposure density and executes the gradation setting process when a detected print density differs from the corresponding exposure density. Subsequently, the controller 800 ends the current control process.

Figure 11:
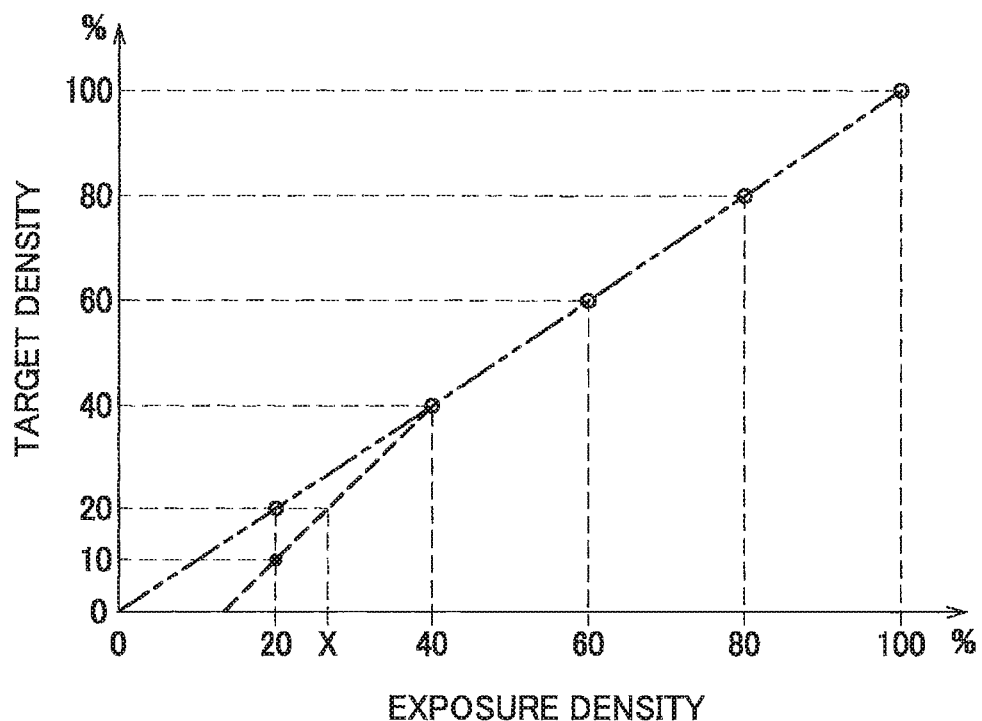
FIG. 11 is a graph illustrating a relationship between a target density and an exposure density.

If the gradation setting process in S11 has not been performed even once in the past, the target densities and exposure densities will be the same values represented by the two-dot chain line with the open circles in FIG. 11. The graph illustrated in FIG. 11 represents the relationship between target density and exposure density. That is, the graph in FIG. 11 indicates the prescribed exposure density of the printing pattern that is selected for a prescribed target density when printing at the prescribed target density.

For example, if the patch sensor 75 detects a patch formed using the first printing pattern P1 corresponding to the 20% exposure density in the gradation setting process and the detected print density for this patch is 10%, as indicated by the filled circle in FIG. 11, the controller 800 overwrites the first printing pattern P1 stored in the memory 830 as a printing pattern corresponding to a 10% target density. That is, since an image formed using the first printing pattern P1 corresponding to a 20% exposure density results in a 10% print density, in the next print control process the controller 800 associates the first printing pattern P1 for a 20% exposure density to a target density of 10% when performing image formation at a 10% target density. In other words, the controller 800 modifies the relationship between the target density and the printing pattern.

Further, when the second printing pattern P2 for a 40% exposure density results in a 40% print density when detected by the patch sensor 75, i.e., when the target density, exposure density, and print density all match, the controller 800 uses linear interpolation to find the relationship between the target density and exposure density in the gradation setting process, as indicated by the bold dashed line in FIG. 11. Consequently, when forming a patch at a target density of 20% in the subsequent print control process, for example, the controller 800 can select a printing pattern having an exposure density X corresponding to the intersecting point of the line indicating a target density of 20% and the bold dashed line and, hence, can print at a suitable print density using this printing pattern. In this way, the controller 800 can properly render gradations on the basis of the target density specified in the print command.

According to the above description, the present embodiment can obtain the following effects.

If the exposure head 40 deviates from the standard position in the optical axis direction, the image tends to be out of focus in the longitudinal direction of the exposure head 40. Therefore, if the angle of the linear patterns G2 relative to the reference line LB, i.e., the longitudinal direction of the exposure head 40 is set to a large first angle θ, as in the second printing pattern P2, whereby the line L of the linear patterns G2 approaches a direction perpendicular to the longitudinal direction of the exposure head 40, the linear patterns G2 will be fatter than intended. Consequently, the density of the printed image when the exposure head 40 deviates from the standard position will differ considerably from the density when the exposure head 40 is in the standard position. Hence, the embodiment converts the linear patterns G2 to the linear patterns GD in the detection pattern PD having a second angle θD relative to the longitudinal direction of the exposure head 40 that is smaller than the first angle θ. Use of these linear patterns GD can reduce the difference between the density when the exposure head 40 deviates from the standard position and the density when the exposure head 40 is in the standard position. Accordingly, by setting the developing bias on the basis of the density of the detection pattern image formed using this detection pattern PD, the developing bias can be set appropriately for cases in which the exposure head 40 deviates from the focal point.

The detection pattern PD is set by rotating the second printing pattern P2 90 degrees. Since the shape of the pattern itself does not change before and after this rotation, error in the exposure density caused by this change can be suppressed.

Since the developing bias is set as an image formation condition, density correction can be performed properly.

While the description has been made in detail with reference to specific embodiment, it would be apparent to those skilled in the art that various changes and modifications may be made thereto as in the following examples. In the following description, like parts and components are designated with the same reference numerals to avoid duplicating description.

Figure 12:
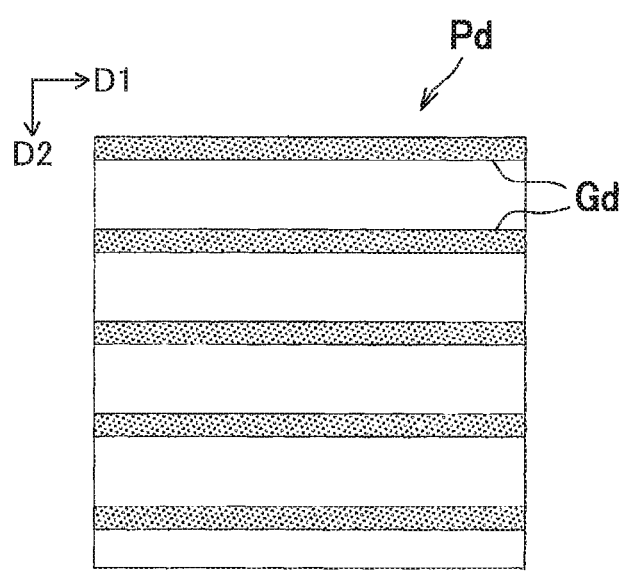
FIG. 12 is a diagram illustrating another example of a detection pattern corresponding to a 40% exposure density in a variation example.

In the conversion process of the present embodiment described above, the second printing pattern P2 is converted to the detection pattern PD configured of the linear patterns GD that slope at the second angle θD relative to the longitudinal direction of the exposure head 40, but the present disclosure is not limited to this conversion. For example, FIG. 12 illustrates a conversion process in which the second printing pattern P2 is converted to a detection pattern Pd configured of linear patterns Gd that are parallel to the longitudinal direction of the exposure head 40. With the linear patterns Gd arranged parallel to the longitudinal direction in this way, the detection pattern Pd can produce substantially the same print density when the exposure head 40 is in the standard position and when the exposure head 40 deviates from the standard position.

While the second printing pattern P2 corresponding to a 40% exposure density is used as the target of the conversion process in the present embodiment described above, a printing pattern corresponding to any exposure density may be the target of the conversion process. For example, a printing pattern corresponding to an exposure density of 50% or less may be subjected to the conversion process, including a printing pattern corresponding to an exposure density between 30 and 45%.

While the first angle θ is an angle greater than 45 degrees in the present embodiment described above, the first angle θ may be set to 45° or less instead.

While the developing bias is used as an example of the image formation condition that is set in the image formation condition setting process in the present embodiment described above, the image formation condition may be another condition, such as a charge bias, exposure intensity, or transfer bias.

While the conversion process is performed in the present embodiment described above when setting the developing bias, the developing bias may be set without executing a conversion process. For example, after executing the conversion process once and setting the developing bias, thereafter the print density of the second printing pattern image based on the second printing pattern P2 may be stored in the memory 830 without performing the conversion process again, and in subsequent processes for setting the developing bias the developing bias may be subsequently set on the basis of the print density of the second printing pattern image formed using the second printing pattern P2 without performing a conversion process.

While the space-adjusting members 300 that contact the contact surfaces 531 of the rotational support members 500 are used as examples of the space-adjusting member of the present disclosure in the present embodiment described above, the present disclosure is not limited to this configuration. For example, the space-adjusting member may be rollers that are rotatably provided on the exposure heads and contact the photosensitive drum.

While the cylindrically shaped photosensitive member 51 is an example of the photosensitive member of the present disclosure in the present embodiment described above, the photosensitive member instead may have a belt shape, for example.

While the scorotron-type charger 52 serves as an example of the charger of the present disclosure in the present embodiment described above, the charger may be a corotron-type charging device or a charging roller that contacts the photosensitive member, for example.

While the exposure head 40 configured of LEDs is an example of the exposure head of the present disclosure in the present embodiment described above, the exposure head may be configured of a device having light-emitting elements other than LEDs, such as electroluminescence (EL) elements or phosphor, for example.

While the transfer rollers 74 serves as an example of the transfer device of the present disclosure in the present embodiment described above, the transfer device may be any device to which a transfer bias is applied, such as an electrically conductive brush or an electrically conductive flat spring, for example.

While the conveying belt 73 is used as an example of the transfer medium of the present disclosure in the present embodiment described above, the transfer medium may be paper instead, for example.

In the present embodiment described above, the color printer 1 is used as the image forming apparatus of the present disclosure, but other image forming apparatuses, such as a monochrome printer, a photocopier, or a multifunction peripheral, may be used as examples of the image forming apparatus of the present disclosure.

All components described above in the present embodiment and the variation thereof may be implemented in any combination.

What is claimed is:

1. An image forming apparatus comprising:
   a developing device configured to form a developer image on a transfer medium, the developing device comprising a photosensitive member;
   an exposure head configured to expose the photosensitive member, the exposure head comprising:
   a plurality of light emitting portions arrayed in an array direction, each of the plurality of light emitting portions emitting light in an optical axis direction; and
   a lens array having a first length in the array direction and a second length shorter than the first length in a direction orthogonal to the array direction;
   a sensor configured to detect a density of the developer image on the transfer medium; and
   a controller configured to perform:
   forming a printing pattern image on the transfer medium using a reference printing pattern having an exposure density corresponding to a prescribed target density, the exposure density being an area ratio of exposed area to total area in the printing pattern image, the reference printing pattern including a plurality of first linear patterns, each of the plurality of first linear patterns forming a first angle with respect to a reference line parallel to the array direction;
   converting the reference printing pattern to a detection pattern including a plurality of second linear patterns, the detection pattern having the exposure density corresponding to the prescribed target density, each of the plurality of second linear patterns forming a second angle with respect to the reference line, the second angle being smaller than the first angle;
   forming a detection pattern image on the transfer medium using the detection pattern;
   detecting a print density of the detection pattern image with the sensor; and
   setting an image formation condition according to the print density detected by the sensor and the prescribed target density.

2. The image forming apparatus according to claim 1, wherein the first angle is greater than 45 degrees, and the second angle is smaller than 45 degrees.

3. The image forming apparatus according to claim 2, wherein the converting converts the reference printing pattern to the detection pattern by rotating the printing pattern 90 degrees.

4. The image forming apparatus according to claim 1, wherein the each of the plurality of second linear patterns is parallel to the reference line.

5. The image forming apparatus according to claim 1, wherein the setting sets a developing bias applied to the developing device as the image forming condition.

6. The image forming apparatus according to claim 1, wherein the controller is configured to further perform:
   forming a plurality of printing pattern images on the transfer medium using a plurality of reference printing patterns having respective ones of a plurality of exposure densities under the image formation condition, the plurality of exposure densities corresponding to respective ones of a plurality of target densities;
   detecting a plurality of print densities of respective ones of the plurality of print pattern images with the sensor; and
   adjusting each of the plurality of exposure densities according to corresponding one of the plurality of print densities detected by the sensor and corresponding one of the plurality of target densities.

7. The image forming apparatus according to claim 1, further comprising a space-adjusting member, and
   wherein the exposure head is movable between a standard position and a retracted position, the exposure head being in proximity of the photosensitive member at the standard position and separated farthest from the photosensitive member at the retracted position, the space-adjusting member being configured to adjust a distance between the photosensitive member and the exposure head at the standard position in the optical axis direction.

8. A method for setting an image formation condition for a developer image formed by an image forming apparatus, the image forming apparatus including: a developing device configured to form the developer image on a transfer medium, the developing device including a photosensitive member; an exposure head configured to expose the photosensitive member, the exposure head including: a plurality of light emitting portions arrayed in an array direction, each of the plurality of light emitting portions emitting light in an optical axis direction; and a lens array having a first length in the array direction and a second length shorter than the first length in a direction orthogonal to the array direction; and a sensor configured to detect a density of the developer image on the transfer medium, the method comprising:
   forming a printing pattern image on the transfer medium using a reference printing pattern having an exposure density corresponding to a prescribed target density, the exposure density being an area ratio of exposed area to total area in the printing pattern image, the reference printing pattern including a plurality of first linear patterns, each of the plurality of first linear patterns forming a first angle with respect to a reference line parallel to the array direction;
   converting the reference printing pattern to a detection pattern including a plurality of second linear patterns, the detection pattern having the exposure density corresponding to the prescribed target density, each of the plurality of second linear patterns forming a second angle with respect to the reference line, the second angle being smaller than the first angle;
   forming a detection pattern image on the transfer medium using the detection pattern;
   detecting a print density of the detection pattern image with the sensor; and setting an image formation condition according to the print density detected by the sensor and the prescribed target density.

9. The method according to claim 8, wherein the first angle is greater than 45 degrees, and the second angle is smaller than 45 degrees.

10. The method according to claim 9, wherein the converting converts the reference printing pattern to the detection pattern by rotating the printing pattern 90 degrees.

11. The method according to claim 8, wherein the each of the plurality of second linear patterns is parallel to the reference line.

12. The method according to claim 8, wherein the setting sets a developing bias applied to the developing device as the image forming condition.

13. The method according to claim 8, further comprising:
forming a plurality of printing pattern images on the transfer medium using a plurality of reference printing patterns having respective ones of a plurality of exposure densities under the image formation condition, the plurality of exposure densities corresponding to respective ones of a plurality of target densities;
detecting a plurality of print densities of respective ones of the plurality of print pattern images with the sensor; and
adjusting each of the plurality of exposure densities according to corresponding one of the plurality of print densities detected by the sensor and corresponding one of the plurality of target densities.

* * * * *